United States Patent Office 3,335,305
Patented Aug. 8, 1967

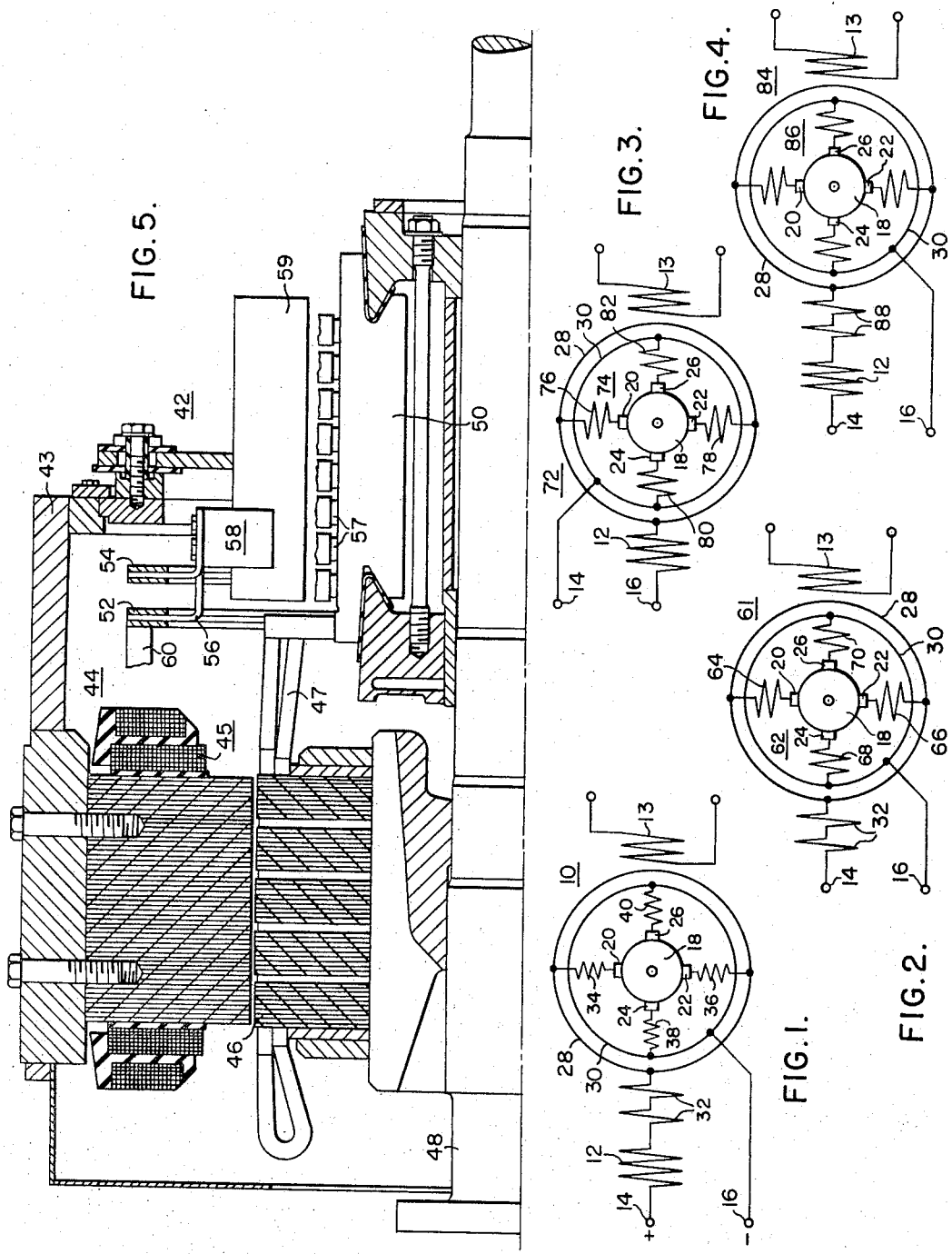

3,335,305
DC DYNAMOELECTRIC MACHINE WITH RESISTIVE MEANS IN SERIES WITH EACH BRUSH
Maurice J. Pasculle, Wilkinsburg, Pa., and Daniel M. Calabrese, Santa Ana, Calif., assignors to Westinghouse Electric Corporation, Pittsburgh, Pa., a corporation of Pennsylvania
Filed Oct. 7, 1964, Ser. No. 402,198
8 Claims. (Cl. 310—148)

ABSTRACT OF THE DISCLOSURE

A direct current dynamoelectric machine having at least two pairs of brushes with resistive means connected in series between each brush and the associated brush connection means. The resistive means may be a series field winding or commutating or compensating field winding.

---

The present invention relates to DC dynamoelectric machines and more particularly to improved internal circuit arrangements therefor.

To achieve balanced armature circuit currents and stable commutation in a DC dynamoelectric machine, resistive components can be connected in series in the various armature circuits. Improved armature current balance follows from the fact that a predetermined load droop characteristic can be realized for each armature circuit to facilitate armature circuit paralleling. That is, by selecting each armature circuit resistance to provide a load droop characteristic with sufficient neagtive slope, the armature circuits can be paralleled for operation with better current distribution among the parallel armature circuits since slight variations in the load droop characteristic from circuit to circuit is then of comparatively little consequence.

In accordance with the principles of the present invention, improved DC machine performance is achieved by an efficiently organized internal circuit arrangement in which resistive means are connected between individual armature brushes and the associated brush cross connection means or rings. Various circuit species are provided with specific advantages associated with each. Advantages common to all of the species include improved armature current balance, improved commutation, increased manufacturing control over the load droop characteristic of the various armature circuits, and an efficient yet simple structural basis for connecting the resistive means to gain these and other advantages.

It is therefore an object of the invention to provide a novel DC dynamoelectric machine in which the machine internal circuitry includes a resistive means in series with the armature circuits so as to provide for improved armature current balancing.

A further object of the invention is to provide a novel DC dynamoelectric machine in which the machine internal circuitry includes resistive means in series with the armature circuits so as to provide for improved commutation.

It is another object of the invention to provide a novel DC dynamoelectric machine in which the machine internal circuitry includes series field means in series with the armature circuits so as to provide improved adjustability and variability in the series field turns by reason of the smaller armature circuit current through the field means.

A further object of the invention is to provide a novel DC dynamoelectric machine in which the machine internal circuitry includes compensating and commutating windings in series with the armature circuits so as to provide improved adjustability and variability in the compensating and commutating turns by reason of the smaller armature circuit current through the compensating and commutating windings.

It is an additional object of the invention to provide a novel DC dynamoelectric machine in which resistive means are provided in series with the armature circuits in a convenient, economic and efficient manner.

These and other objects of the invention will become more apparent upon consideration of the following detailed description along with the attached drawings, in which:

FIGS. 1–4 show respective schematic diagrams of machine internal circuit arrangements forming various species of the invention.

FIG. 5 shows a schematic view of a longitudinal section of a DC dynamoelectric machine so as to indicate the convenient manner in which the various circuits of FIGS. 1–4 can be mechanically embodied in a DC machine.

More specifically, as a first species, there is shown in FIG. 1 an internal circuit arrangement 10 for a DC dynamoelectric machine in which series field winding means 12 are connected between input terminals 14 and 16 in series with armature circuit means 18 through brushes 20, 22, 24 and 26. Suitable shunt field winding means 13 are also provided for the machine and it can be separately excited or self-excited in the usual manner. In this instance, the machine which embodies the circuit arrangement 10 is structurally provided with four magnetic poles but fewer or more poles can be provided in the machine if desired. However, in a two pole machine there is no advantage of armature current balancing since only a single armature circuit is provided.

The brushes 20 and 22 are commonly connected to a positive brush or brush holder bracket cross connection means or ring 28, and similarly the brushes 24 and 26 are commonly connected to a negative brush holder bracket cross connection means or ring 30. Between the positive brush connection means or ring 28 and the input terminal 14, compensating and commutating winding means 32 are connected in series with the series field winding means 12.

Physically, the series field winding means 12 can in this species be formed from strap conductors wrapped around the various machine pole bodies. The compensating winding means can be formed by conductor straps extended across the pole faces, and the commutating or interpole winding means can be formed by windings physically disposed on commutating poles between the main poles. For simplicity, the series field winding means 12 and the commutating and compensating winding means 32 are shown as lumped elements whereas in actuality they are respectively formed by individual winding elements distributed about the machine periphery and suitably interconnected to form the lumped elements.

Resistive means, in this species in the form of respective resistors 34, 36, 38 and 40, are connected between each brush 20, 22, 24 and 26 and the associated brush connection means or ring 28 or 30. This circuit provision provides the advantages previously outlined including improved current balance in the armature circuits and improved commutation.

These improvements are achieved in an economic and convenient manner as illustrated in FIG. 5. Thus, in this figure there is shown a DC dynamoelectric machine 42 having a stator 44 having field winding means 45 and a rotor 46 having armature circuit means 47 mounted on a shaft 48. A commutator 50 is disposed adjacent one end of the shaft 48 and in proximity to the commutator 50 there are provided positive and negative brush connection means or brush holder bracket cross connection rings 52 and 54 respectively corresponding to the rings 28 and 30 schematically illustrated in FIG. 1.

The rings 52 and 54 are suitably mounted in insulative relation to machine frame 43 in any well known manner. Each ring 52 or 54 is provided with circuit connections or leads 56 and 58 to various brushes 57 or brush holder brackets 59 associated with it about the outer periphery of the commutator 50 and the inner periphery of the ring 52 or 54. In the circuit connections 56 or 58, the resistors 34, 36, 38 and 40 schematically illustrated in FIG. 1 (and additional resistors if more poles are provided in the machine 42) can be serially connected in a convenient and economic manner. In other species of the invention, such as those in FIGS. 2–4, suitable conductors can be used to connect the specific resistive means in the circuits 56 and 58 with similar convenience and economy. For the species of FIG. 1, the negative ring 54 is suitably connected to an input terminal (not shown in FIG. 5) schematically indicated by the terminal 16 in FIG. 1. The positive ring 28 is connected to series field winding and compensating and commutating winding means 45 of the machine 42 in correspondence to the schematically illustrated winding means 12 and 32 in FIG. 1, through suitable conductor means 60 connected to the positive ring 52. In other species, appropriate physical conductor connections can be made by designer's choice to complete the connections for the rings 52 and 54 in conformity with the circuitry of the particular species.

In the species shown in FIGS. 2–4, elements similar to those included in the species of FIG. 1 are provided and therefore like reference characters have been used for like elements in the various species. In circuit arrangement 61 of FIG. 2, the resistors 34, 36, 38 and 40 are eliminated and series field winding means 62 are provided with respective portions 64, 66, 68 and 70 respectively connected between the brushes 20, 22, 24 and 26 and the cross connection rings 28 and 30. The series field winding portions 64, 66, 68 and 70 respectively are associated with the magnetic poles with which the brushes 20, 22, 24 and 26 are associated. To a degree, the field winding means 62 as connected provides the advantages of improved armature current balance and improved commutation. In addition, since smaller currents are carried by each winding portion 64, 66, 68 or 70, the field winding means 62 can in many applications have materially reduced cross-section and thus can be formed by wound wire rather than strap conductors and further can have an enlarged number of turns for a given ampere-turn specification so as to provide improvement in the adjustability and variability in the number of series field turns and the series field effect achieved by the field winding means 62.

In the species of FIG. 3, an internal DC machine circuit arrangement 72 includes compensating and commutating winding means 74 which are divided into portions 76, 78, 80 and 82 respectively connected between the brushes 20, 22, 24 and 26 and the cross connection rings 28 and 30. The compensating and commutating winding means 74 thus serve as resistance means serially interconnected with the armature 18 in separate paths through the brushes 20, 22, 24 and 26 so as again to provide the advantages of improvement in armature current balance and commutation. In addition, improved variability and adjustability in the number of turns is provided for the winding means 74 since smaller currents are carried by the portions 76, 78, 80 and 82 to require more turns for a given ampere turn specification. As a further benefit from the smaller currents, the winding means 74 and particularly the compensating winding elements thereof can in many applications be provided in wound wire rather than in strap conductor form. If desired, only the compensating winding or only the commutating winding can be connected between the brushes and the rings 28 and 30.

As shown in FIG. 4, a DC machine internal circuit arrangement 84 can also be provided with winding means 86 as the impedance means connected between the brushes 20, 22, 24 and 26 and the collecting rings 28 and 30, with a portion 88 of the winding means 86 serially connected between the cross connecting ring 28 and the terminal 14. In this instance, the winding means 86 comprises compensating and commutating winding elements and the winding portion 88 advantageously is connected externally of the brush holder cross connection ring for the purpose of buck-boost during test in determining the correct commutating pole air gap. Alternately, the commutating winding means can be entirely connected between the ring 28 and the brushes 20, 22, 24 and 26 with the compensating winding means totally connected externally of the ring 28. In such a scheme, the compensating winding would then be used for buck-boost during test.

In both the species of FIGS. 3 and 4, an almost unlimited number of combinations of compensating winding conductors per slot and pole slots are possible so as to give more perfect compensation of armature reaction as a result of the fact that many turns are provided in the winding means at low current. An almost micrometer adjustment of excess ampere turns is thus available during design because of the many turns required.

The foregoing description has been presented only to illustrate the principles of the invention. Accordingly, it is desired that the invention be not limited by the embodiments described, but, rather, that, it be accorded in an interpretation consistent with the scope and spirit of its broad principles.

What is claimed is:

1. An internal circuit arrangement for a DC dynamoelectric machine comprising a plurality of brush pairs, positive brush connection means with which one brush of each of said brush pairs is associated, negative brush connection means with which the other brush of each of said brush pairs is associated, leads for effecting electrical connection to said brushes and said brush connection means, resistive means connected in series with said leads between each of said connection means and each associated brush, and winding means in series between one of said connection means and an external terminal of said circuit arrangement.

2. An internal circuit arrangement for a DC dynamoelectric machine comprising a plurality of brush pairs, a positive brush cross connection ring to which one brush of each of said brush pairs is electrically connected, a negative brush cross connection ring to which the other brush of each of said brush pairs is electrically connected, series field winding means connected between each of said rings and the associated brush, and winding means in series between one of said cross connection rings and an external terminal of said circuit arrangement.

3. An internal circuit arrangement for a DC dynamoelectric machine comprising a plurality of brush pairs, a positive brush cross connection ring to which one brush of each of said brush pairs is electrically connected, a negative brush cross connection ring to which the other brush of each of said brush pairs is electrically connected, commutating and compensating winding means connected between each of said rings and the brushes associated therewith, and winding means in series between one of said connection rings and an external terminal of said circuit arrangement.

4. An internal circuit arrangement for a DC dynamoelectric machine as set forth in claim 2 wherein said winding means connected between said external terminal and said one connection ring comprises compensating and commutating winding means.

5. An internal circuit arrangement for a DC dynamoelectric machine as set forth in claim 3 wherein said winding means connected between said external terminal and said one connecting ring comprises series field winding means.

6. An internal circuit arrangement for a DC dynamoelectric machine comprising a plurality of brush pairs, a positive brush cross connection ring to which one brush of each of said brush pairs is electrically connected, a negative brush cross connection ring to which the other brush of each of said brush pairs is electrically connected, a portion of compensating and commutating winding means connected between each of said rings and the brushes associated therewith, and winding means connected in series between one of said connection rings and an external terminal of said circuit arrangement, the latter winding means comprising series field winding means and another portion of said compensating and commutating winding means.

7. An internal circuit arrangement for a DC dynamoelectric machine comprising a plurality of brush pairs, a positive brush cross connection ring to which one brush of each of said brush pairs is electrically connected, a negative brush cross connection ring to which the other brush of each of said brush pairs is electrically connected, respective resistors connected between each of said rings and the brushes associated therewith, and winding means in series between an external terminal of said circuit arrangement and one of said connection rings.

8. An internal circuit arrangement for a DC dynamoelectric machine comprising a plurality of brush pairs, a positive brush cross connection ring to which one brush of each of said brush pairs is electrically connected, a negative brush cross connection ring to which the other brush of each of said brush pairs is electrically connected, respective resistors connected between each of said rings and the brushes associated therewith, and series field winding means and compensating and commutating winding means connected in series between an external terminal of said circuit arrangement and one of said connection rings.

References Cited

UNITED STATES PATENTS 2,981,879   4/1961   Taylor _____ 318—246

MAX L. LEVY, *Primary Examiner.*

J. W. GIBBS, *Assistant Examiner.*